(12) United States Patent
Kawano et al.

(10) Patent No.: US 7,945,772 B2
(45) Date of Patent: May 17, 2011

(54) APPARATUS, METHOD AND PROGRAM PRODUCT FOR INITIATING COMPUTER SYSTEM OPERATION

(75) Inventors: Seiichi Kawano, Kanagawa-ken (JP); Kenneth Blair Ocheltree, Ossining, NY (US); Robert Stephen Olyha, Jr., LaGrange, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 42 days.

(21) Appl. No.: 12/648,728

(22) Filed: Dec. 29, 2009

(65) Prior Publication Data

US 2010/0106952 A1    Apr. 29, 2010

Related U.S. Application Data

(62) Division of application No. 11/939,814, filed on Nov. 14, 2007, now Pat. No. 7,647,491, which is a division of application No. 10/304,295, filed on Nov. 26, 2002, now Pat. No. 7,328,333.

(30) Foreign Application Priority Data

Dec. 7, 2001 (JP) .................................. 2001-374802

(51) Int. Cl.
*G06F 9/00* (2006.01)
*G06F 15/177* (2006.01)
(52) U.S. Cl. ............................................. 713/2; 713/1
(58) Field of Classification Search .................. 713/1, 2
See application file for complete search history.

(56) References Cited

U.S. PATENT DOCUMENTS

| 6,029,183 | A | 2/2000 | Jenkins et al. |
| 6,266,776 | B1 * | 7/2001 | Sakai ............................. 713/300 |
| 6,584,533 | B1 | 6/2003 | Cho et al. |
| 6,643,721 | B1 | 11/2003 | Sun |
| 6,668,318 | B1 | 12/2003 | Jenkins et al. |
| 6,920,553 | B1 | 7/2005 | Poisner |
| 6,928,542 | B2 | 8/2005 | Wen et al. |
| 7,231,481 | B2 | 6/2007 | Scott et al. |
| 2001/0018717 | A1 * | 8/2001 | Shimotono .................. 709/319 |
| 2002/0157001 | A1 | 10/2002 | Huang et al. |
| 2005/0182922 | A1 * | 8/2005 | Guo et al. ......................... 713/1 |
| 2006/0080385 | A1 | 4/2006 | Blandford et al. |
| 2011/0022832 | A1 * | 1/2011 | Motohama et al. ............... 713/2 |

FOREIGN PATENT DOCUMENTS

| JP | 7219885 | 8/1995 |
| JP | 2003196096 A * | 7/2003 |

OTHER PUBLICATIONS

Ragland et al, Intel Offers Boot-to-USB in Desktop Boards, DeveloperUPDATEMagazine,May 2001,5 pages.

* cited by examiner

*Primary Examiner* — Mark Connolly
(74) *Attorney, Agent, or Firm* — Patrick J. Daugherty; Driggs, Hogg, Daugherty & Del Zoppo Co., LPA

(57) ABSTRACT

A computer system which includes a CPU for performing various processes by program control and storage elements which store at least one operating system and a BIOS, wherein upon starting a system, the CPU recognizes the system's own hardware configuration, and starts a selected one operating system stored in the storage elements in accordance with the recognized hardware configuration under the control of the BIOS.

12 Claims, 4 Drawing Sheets

APPARATUS, METHOD AND PROGRAM PRODUCT FOR INITIATING COMPUTER SYSTEM OPERATION

RELATED APPLICATION

This application is a division of application Ser. No. 11/939,814, filed Nov. 14, 2007, which is a division of U.S. Pat. No. 7,328,333 B2, issued Feb. 5, 2008, which claims priority of Japanese application Serial No. 2001-374802, filed Dec. 7, 2001.

FIELD AND BACKGROUND OF INVENTION

The present invention relates to an apparatus, method and program product for initiating operation of a computer system and particularly to starting up a computer by selectively switching operating systems installed in the computer.

As pieces of electronic equipment have downsized and sophisticated in recent years, portable computers including notebook computers and hand-held computers have achieved as high performance as that of desktop computers. Accordingly, systems have appeared which provide portability and expandability with all kinds of media drives and I/O interfaces integrated into a single docking station.

This allows a user to employ a single computer with a simple hardware configuration for portable use and also to employ various features of peripheral devices by attaching a docking station thereto.

In a modern computer, system management or a user's fundamental operating environment is usually provided by an operating system (hereinafter referred to as OS). The operating environment to be provided differs according to the type of OS loaded and executed in a computer systems central processing unit (CPU). Therefore, it is preferable to select an appropriate OS according to a work environment or a purpose. It may also be desirable to select an appropriate OS for recovery from disastrous failures such as the loss or improper removal of a hard drive. Such recovery may be as simple as enabling limited use of the computer system for particular purposes, such as network access to call in appropriate help.

For example, in a personal computer such as a desktop computer or a notebook computer, a versatile OS (hereinafter referred to as a general-purpose OS) such as UNIX or Windows (Microsoft Corporation) is commonly used, while in a hand-held computer such as PDA (Personal Digital Assistant), a compact OS (hereinafter referred to as a small OS) such as Pocket PC or Windows CE (Microsoft Corporation) or Palm OS (Palm Inc.) is used.

In a general-purpose OS, functions to be provided may have various types of designs and a wide variety of designs also exist for a user interfaces. On the other hand, since much significance is put on portability of a computer in a small OS, a small OS is subject to various limitations as follows: A program is required to be small in size in order to reduce the number of mechanical structures, for example magnetic memory, as much as possible, which significantly affects weight of a computer or operating time of a battery. And a user interface is required to have a design which takes account of operability on a small screen.

Since system management and a fundamental operating environment in a computer is provided by an OS, an OS to be installed on a computer is preferably selected accordance with an environment or a purpose of the computer. However, in the case of the system in which a hardware configuration and an operating environment greatly differs between when it is used as a portable unit and when it is attached with a docking station, the type of an appropriate OS may also differ between these situations. Similar consideration may impact disaster recovery as mentioned above.

In one specific example, a simple hardware configuration for a portable use preferably uses the above-described small OS, while a docking station-attached configuration preferably uses a more versatile general purpose OS. In another example, the unavailability of a general purpose OS due to disastrous failure may result in a small OS being sufficient to enable necessary limited functionality.

A conventional approach to selecting and booting a plurality of OS in a computer includes a method that loads a plurality of OS in a plurality of storage devices, then operates a predetermined program tool upon starting a computer to select an OS to start. Another method has also been used that prepares a plurality of hibernation files corresponding to a plurality of OS with hibernation technique, and selects an OS by selecting a desired file among the above-described hibernation files upon restarting.

In either case, however, a normal boot sequence of a computer must execute once and an OS to start must be selected during that sequence.

Under the environment of a computer with frequent power-on/power-off as used as a portable unit, the question is how to shorten a time period from the start of an OS to the start of a work. However, a method using a predetermined program tool or hibernation technique requires a certain period of time for starting an OS by executing a normal boot sequence. Therefore, high-speed startup such as that of a PDA cannot be expected from the above-described method.

Due to its large program size, the general-purpose OS is commonly stored on a magnetic disk storage (hard disk storage). When a computer is used as a portable unit, a mechanical configuration of the magnetic disk storage could be harmed as an OS is being read out from the disk by powering the computer on.

SUMMARY OF THE INVENTION

One purpose of the present invention is to provide a work environment that uses an appropriate OS by selectively and automatically starting a selected OS in accordance with a recognized hardware configuration.

Another purpose of the present invention is to selectively and quickly start at least one OS without accessing a magnetic disk storage.

The present invention achieving the above-described objects is implemented as a computer system wherein the computer system includes a CPU for performing various processes by program control and storage elements which store at least one operating systems and a BIOS, wherein upon starting a system, the CPU recognizes the system's own hardware configuration, and starts a selected one operating system stored in the storage elements in accordance with the recognized hardware configuration under the control of the BIOS.

More preferably, the computer system is configured to further include an interface for connecting peripheral devices thereto and selects an operating system to start in accordance with whether a predetermined peripheral device is connected to the interface or not. Any device can be set as such a predetermined peripheral device. For example, it can be a docking station for improving the extensibility of the computer system. Alternatively, the device may be such as a non-volatile memory attached by means of an external interface such as a USB port.

Another computer system according to the present invention includes a CPU for performing various processes by program control and main memory for storing a program that controls the CPU, wherein the CPU stores a program image of a second operating system in a predetermined memory area of main memory under the control of a first operating system, and powers off the CPU after storing contents of the main memory, and then, upon starting the system, starts either a first operating system or a second operating system of which a program image is stored in the main memory.

Suspend (stand-by) or hibernation can be used as means to store contents of main memory and to power off the CPU.

Such a computer system, as it starts in the above-described manner, can recognize the system's own hardware configuration, and determine which of a first operating system and a second operating system is to be started in accordance with the recognized hardware configuration. In the case of starting a second operating system, resume control can be performed without powering on a storage, such as magnetic disk storage. At least the first operating system of the above-described operating systems can be configured to correspond to ACPI (Advanced Configuration and Power Interface) and to set an NVS (Non-Volatile Sleeping memory) as a memory area free for use.

Another computer system according to the present invention includes a CPU for performing various processes by program control, main memory for storing a program that controls the CPU, a first storage device for storing a first operating system that can set a memory area free for use which is not used by the operating system itself and free for other pieces of software to use, a second storage device for storing a second operating system in a size which can be stored in the memory area free for use, characterized in that the CPU sets a memory area free for use on a main memory under the control of the first operating system, stores a program image of the second operating system that has read out from the second storage device into the memory area free for use, and starts either of the first or the second operating system in accordance with contents of the main memory in startup control of the system.

Another computer system according to the present invention includes a main unit of a computer and a peripheral device that adds various features to the main unit, characterized in that the main unit of the computer includes a first storage device for storing a first operating system that operates in an environment with a peripheral device connected thereto, and a second storage device for storing a second operating system that operates in an environment without a peripheral device connected thereto, wherein the main unit of the computer selectively starts either the first or the second operating system in accordance with whether the peripheral device is connected thereto or not.

The present invention can also be provided as a method of controlling a computer including a step of recognizing the system's hardware configuration as it starts up, and a step of starting any of a plurality of operating systems stored on a storage device in accordance with the recognized hardware configuration.

More preferably, the present invention is characterized in that the step of recognizing a hardware configuration includes a step of acquiring a device ID from a predetermined peripheral device, and the step of starting an operating system includes a step of determining which operating system to start in accordance with the acquired device ID.

Another start control method of a computer system according to the present invention includes steps of storing a program image of a second operating system on a predetermined memory area in main memory under the control of a first operating system, bringing a system into a suspended state, and starting either the first operating system or the second operating system, of which a program image is saved to the main memory, in a process of resuming from the suspended state.

More preferably, the start control method of the computer system further includes a step of recognizing the system's own hardware configuration in a process of resuming from the suspended state, and the step of starting an operating system includes a step of determining which of the first and the second operating system is started in accordance with the hardware configuration recognized at the step of recognizing the hardware configuration.

Alternatively, the step of starting the operating system includes, in the case of starting a first operating system, steps of powering a magnetic disk storage on and reading out and starting the first operating system from a magnetic disk storage, while in the case of starting a second operating system, a step of starting the second operating system from a program image stored in main memory without powering a magnetic disk storage on.

Yet another start control method of a computer system according to the present invention is that it includes steps of storing a program image of a second operating system on a predetermined memory area in main memory under the control of a first operating system, powering the system off after saving contents of main memory to a magnetic disk storage for example, reading the contents of main memory that is stored in the magnetic disk storage into the main memory after powering the system on, and starting either the first operating system or the second operating system, of which a program image is stored in the main memory, in accordance with the contents read into the main memory.

The present invention can also be provided as a program that implement the above-described computer system or control method thereof, e.g., BIOS (Basic Input/Output System) or OS (Operating System). These programs may be provided by distributing a magnetic disk or an optical disk, a semiconductor memory or other storage medium that have stored them, or by distributing them via a network.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The present invention will now be described in detail based on an embodiment illustrated in attached drawings. The embodiment previously stores a small OS that is suitable for an environment of the computer for portable use and a general-purpose OS that is suitable for an environment used with a docking station attached thereto (when it is used as a desktop computer), then performs switch control for starting an appropriate OS in accordance with a hardware configuration of the computer.

Figure 1:
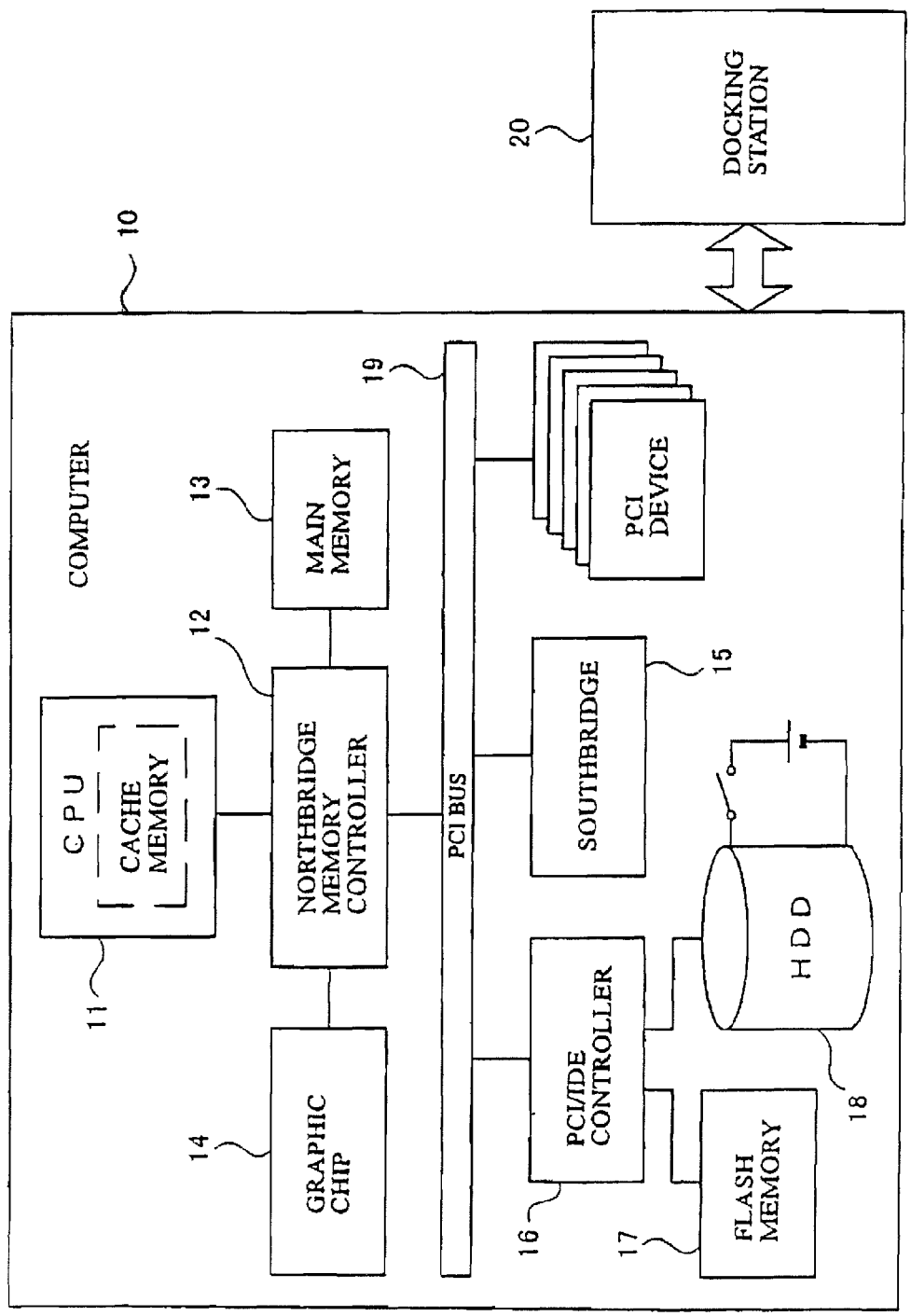
FIG. 1 is a diagram showing a hardware configuration of a computer providing an OS switch method according to the embodiment.

FIG. 1 is a diagram showing a hardware configuration of a computer implementing a method for switching OS's according to the embodiment.

As shown in FIG. 1, a computer 10 of the embodiment includes a CPU (Central Processing Unit) 11, which is a processing unit, a Northbridge memory controller (hereinafter referred to as Northbridge) 12, main memory 13 and a graphic chip 14 connected to a CPU 11 via a Northbridge 12, a Southbridge 15 and a PCI/IDE controller 16 connected to Northbridge 12 via a PCI bus 19. A flash memory 17 and HDD (magnetic disk storage) 18 are connected to a PCI/IDE controller 16.

Also as shown in FIG. 1, a computer 10 can be connected to a docking station 20 via a predetermined interface. The docking station 20 is given a device ID for recognition, which is sent from the docking station 20 to the computer 10 as the computer 10 and the docking station 20 are connected. Therefore, the computer 10 can recognize that the docking station 20 is connected thereto.

Although it is not illustrated in the drawing, a docking station 20 includes various kinds of interfaces such as USB or IEEE1394, thereby various peripheral devices can be used by attaching themselves to the docking station 20 on a computer 10. A docking station 20 may have any configuration; it can include a display device, an input device such as a keyboard, a media drive, and other peripheral devices, if necessary. An interface such as a USB port may also be provided on the computer 10.

In FIG. 1, Northbridge 12 and Southbridge 15 are motherboard chipsets, performing system control by connecting a CPU 11 and a PCI bus 19 or other buses (e.g. ISA bus). A flash memory 17 stores a small OS that is suitable for an operating environment in a hardware configuration of a computer 10 for portable use (hereinafter referred to as portable configuration). A compact flash or other ROM (Read Only Memory), or a nonvolatile memory such as NVRAM (Nonvolatile Random Access Memory) may substitute a flash memory 17. HDD 18 stores a general-purpose OS that is suitable for an operating environment in a hardware configuration of a computer 10 with a docking station 20 attached thereto (hereinafter referred to as an extended configuration). An OS that is stored in the flash memory 17 or HDD 18 is read out and loaded into main memory 13 to control a CPU 11 so that various types of information processing are performed.

Power supply can be controlled individually for each component shown in FIG. 1. It is a general practice to reduce power consumption while using a computer, if HDD 18 is not accessed for a certain period of time, for example, power supply to the HDD 18 is suspended by controlling. Under a suspended (standby) condition, power supply for each component except for a portion for main memory 13 and a Southbridge 15 that is need for maintaining data and for receiving operations on resume is suspended.

A computer 10 according to the embodiment is integrally or detachably provided with an input/output device consisting of a compact display device (of a few inches, for example) and a touch-panel provided on the display device, thereby an image is displayed through display control with a graphic chip 14 and input is made possible with input means such a pen input. This allows a computer 10 alone (in a portable configuration) to be used as a simple hand-held device such as PDA. Otherwise, as described above, the computer 10 can be used as a general-purpose computer system by attaching a docking station 20 (in an extended configuration).

In view of the above-mentioned hardware configuration, a small OS that is used in a portable configuration supports pen input as input means. The small OS also has a GUI designed for being displayed on a compact display device. Main purposes of a computer 10 in a portable configuration include such purposes as referring, inputting and editing a telephone directory, memorandum, schedule data, etc. that are covered by a PIM (Personal Information Manager).

On the other hand, a general-purpose OS has a GUI that corresponds to a general input device such as a keyboard or a mouse and that puts emphasis on operability on a somewhat large display. It makes it possible to use a peripheral device including a printer or a media drive, and to perform information processing or manipulation with various pieces of application software.

OS's used for the embodiments, including both a general-purpose OS and a small OS, have a suspend/resume functions. A general-purpose OS can define the memory area that is not used by the OS itself and free for predetermined pieces of software (hereinafter referred to as a memory area free for use) in the memory space.

In the embodiment, a program image of a small OS, which is stored in a flash memory 17, is previously generated on a free memory area. The term "program image" refers to a program stored in a memory. In a suspended state of a general-purpose OS, the whole contents of main memory 13 containing the free memory area are saved so that a program image of a small OS will be saved as well. Therefore, startup of this small OS is made possible by having registered an address of a small OS stored in the free memory area as an entry point to be used upon resuming from a suspended state, and jumping to the entry point at the time of resuming. As a matter of course, if a computer is resumed in the normal procedure from a suspended state and process to an entry point prepared by a general-purpose OS, a general-purpose OS will start. In the above-described manner, switching selection of OS's become possible during a resume operation from a suspended state.

In the case of an OS that supports ACPI (Advanced Configuration and Power Interface), for example, a memory area such as a NVS (Non-Volatile Sleeping memory) can be used as an above-described memory area used in the embodiment.

Figure 2:
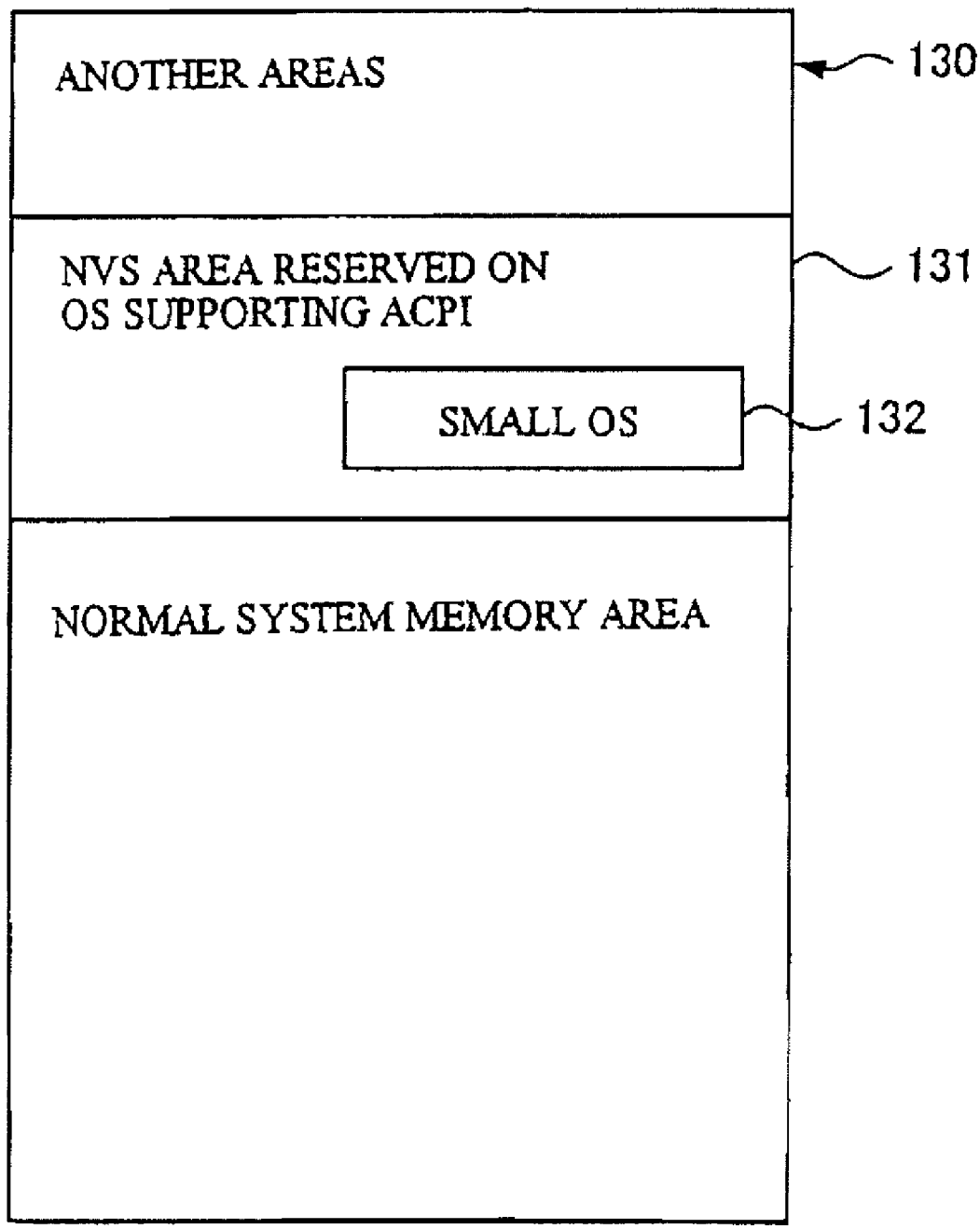
FIG. 2 is a diagram showing an exemplary state of use of a memory space with an OS that supports ACPI.

FIG. 2 is a diagram showing an exemplary state of use of a memory space with an OS supporting ACPI.

Referring to FIG. 2, a NVS area 131 is set on a memory space 130 by the control of a general-purpose OS and a small OS image 132 is created thereon.

On the basis of the above-described configuration, a computer 10 according to the embodiment will operate in any of the following three states;
(1) a state of a small OS operating alone,
(2) a state of a general-purpose OS operating,
(3) a state of a small OS operating using a memory area free for use provided in a general OS.

In the early stage of powering on a computer 10 and getting hardware started, either a small OS or a general-purpose OS is started, bringing a state of (1) or (2). After a general-purpose OS has started (in the state of (2)), state of (2) or (3)

can be selected through suspend and resume by storing a small OS into memory area free for use. Consequently, OS's to be used can be switched.

A computer 10 also recognizes hardware configuration as it resumes from a suspended state with a small OS being stored in a memory area free for use. Then it selects whether to start a small OS or a general-purpose OS in accordance with the recognized hardware configuration. Specifically, in the case a computer 10 recognizes that it is operating alone, it starts a small OS, while in the case it recognizes that a docking station is attached thereon, it starts a general-purpose OS. Therefore, an OS to start is selected in accordance with the recognized absence or presence of a docking station 20. The presence of a docking station 20 can be identified by determining whether a device ID was sent from a docking station 20 as the OS starts.

Recognition of a hardware configuration and determination and startup of an OS to start upon resuming from the above-described suspended state are provided as a feature of BIOS (Basic Input/Output System). BIOS is a program that controls not only essential devices such as a keyboard, a floppy disk drive, and a hard disk drive but also the startup of a computer 10. BIOS is stored in a ROM that is not shown in FIG. 1.

When a computer 10 is powered on for the first time, either a small OS or a general-purpose OS can be set to start. Since hardware is checked with POST (Power On Self Test), which is performed under the control of BIOS during the startup process, startup control can be performed to determine an OS to start by checking the hardware configuration.

In the system corresponding to ACPI, during the startup process of a computer 10, an ACPI table and the like are created on main memory 13 by POST and ACPI is set. Therefore, in the case of using a NVS area of ACPI as a memory area free for use, startup control such as to read a program image of a small OS from a flash memory 17 and to create it in a NVS area during a POST can be initially performed along with a startup of a general-purpose OS (as a computer 10 is powered on for the first time). In such a manner, a general-purpose OS starts immediately after powering on a computer 10 and a small OS will stay stored in a NVS area, so that switching of OS's by performing suspend and resume becomes possible.

An operation of resuming from a suspended state will now be described.

Figure 3:
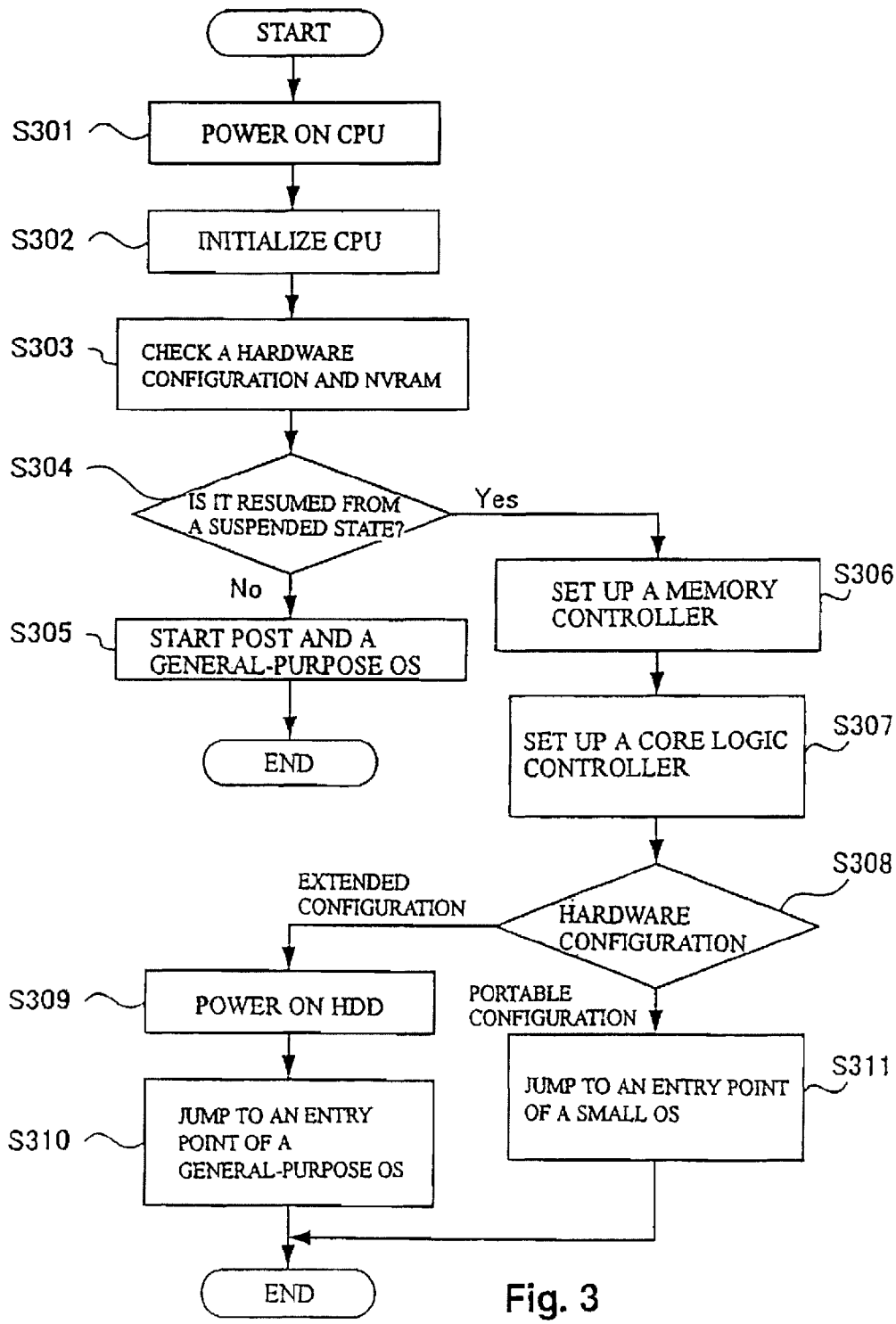
FIG. 3 is a flowchart illustrating an operation at the startup of a computer according to the embodiment.

FIG. 3 is a flowchart illustrating an operation of a computer 10 according to the embodiment during the startup process.

As an initial state, a computer 10 is assumed to be transferred into a suspended state after a general-purpose OS has previously started and a small OS has been stored in a memory area free for use. Whether a computer 10 is in a suspended state or not is identified by entering flag data into a predetermined NVRSAM, which is not shown in FIG. 1. When a computer 10 is powered on for the first time, a general-purpose OS starts.

As a resume operation is performed and a CPU 11 is powered on in this state, a CPU 11 (including a cache memory) is initialized under the control of BIOS at first (steps 301 and 302). Then, a hardware configuration and a NVRAM is checked (step 303). If a docking station 20 is connected to a computer 10 at this moment, a device ID of the docking station 20 is acquired.

Then, whether it is a normal startup by powering on a computer 10 or it is resumed from a suspended state is determined according to a check results of a NVRAM or contents of an internal register of hardware such as an ASIC (step 304).

If it is determined to be a normal startup, a general-purpose OS is started by performing a POST (step 305).

If flag data indicating that a computer 10 is in a suspended state is stored in a NVRAM, for example, the process proceeds to an operation of resuming from a suspended state, and a memory controller is set up (steps 304 and 306), then other core logic controllers are set up (step 307).

Next, the check results of a hardware configuration taken at step 303 is examined. If a device ID of a docking station 20 is detected, it is apparently in an extended configuration (step 308). Then system then powers on HDD 18 (step 309), and jumps to an entry point for resuming a state before suspension by starting a general-purpose OS (step 310).

On the other hand, in the case that a device ID of a docking station 20 is not detected or in the case that an ID indicating a portable configuration is detected in step 308, it is apparently in a portable configuration. Then system then jumps to an entry point for starting a small OS stored in a memory area free for use of main memory 13 (step 311).

Since both a small OS and a program or data processed thereon are generally small in size, operation may be performed without using HDD 18 in such a manner implemented in PDA and the like. Therefore, a small OS starts without powering on HDD 18 as in step 309. By omitting an operation of HDD 18, a mechanical structure of HDD 18 is protected against harm, which could be done during the use of a computer 10. Since it eliminates mechanical operation at higher power consumption, it can also contribute to power saving.

As a computer 10 is used after switching OS's in the above-described manner, by using synchronization features such as Briefcase, which is provided in Windows, an OS from U.S. Microsoft Corporation, data processed by these two OS can be adjusted.

As described above, the uses of a computer 10 during a small OS operation are something like information reference, input and editing mainly by PIM, so that a process that place a heavy load on a CPU 11 is not required. In case of starting a small OS, it can further contribute to power saving by operating a CPU 11 in low performance reducing the power consumption.

The above-described embodiment provides switching of OS's by storing a program image of a small OS in a memory area free for use set on main memory 13 and by performing suspend and resume under the control of a general-purpose OS. Considering the implementation with a small OS using a computer 10 for portable use, it is preferable to employ the above-described switching approach using a suspend/resume function that can start a small OS without making HDD 18 operate. As it has resumed from a suspended state, it is also preferable to start an OS very quickly.

However, in a suspended state, power is supplied to main memory 13 to maintain the contents thereof. Therefore, if a computer is kept in a battery driven state for a long period of time, the battery will run out and contents of main memory 13 may be lost. Then, switching OS's can be assumed to be provided in the above-described manner by using the hibernation feature, which saves contents of work (contents of main memory 13) to HDD 18 as a computer 10 is powered off. In the case of using a NVS area of ACPI as a memory area free for use, contents of the NVS area are secured to be kept by hibernation.

In other words, the computer 10 is powered off after storing the contents of main memory 13, which stores a program image of a small OS in a memory area free for use, into a data saving area reserved on HDD 18. As a result, no electrical power is consumed so that a state in which a program image of a small OS is stored in a memory area free for use will not be lost. When a computer 10 starts, contents of main memory 13 that have been stored in HDD 18 are copied onto main memory 13, thereby OS's may be selectively started in the same manner as the above-described resume operation by means of suspend and resume.

Figure 4:
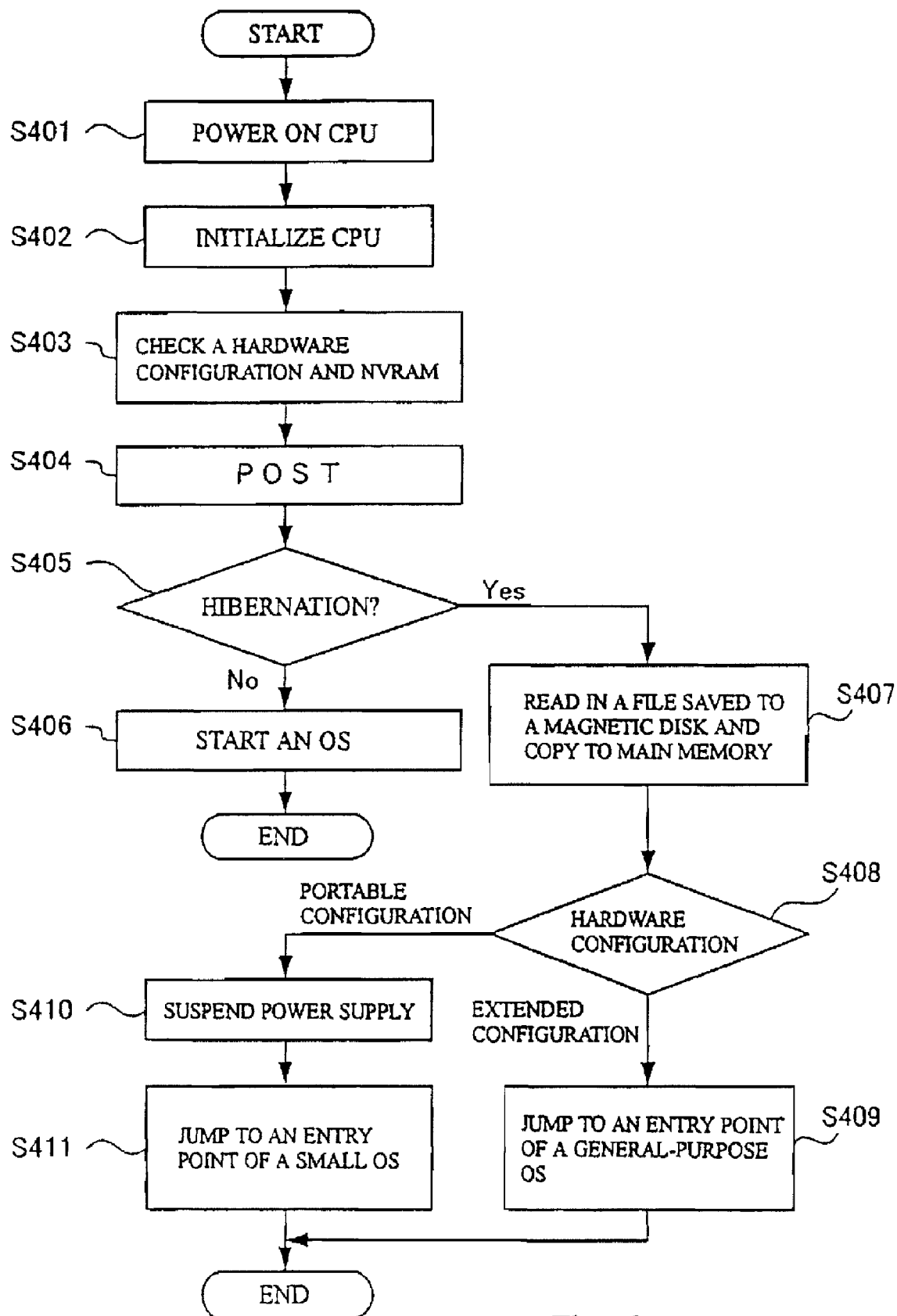
FIG. 4 is a flowchart illustrating an operation at the startup of a computer in the case of switching OS's to start by using hibernation function.

FIG. 4 is a flowchart illustrating an operation upon starting a computer 10 in the case of switching OS's to start by means of a hibernation function.

As an initial state, a computer 10 is assumed to be in the state of being powered off after previously starting a general-purpose OS, storing a small OS in a memory area free for use, then storing contents of main memory 13 in HDD 18 by means of hibernation. Whether a computer 10 uses a hibernation function or not is identified by entering flag data into a predetermined NVRAM, which is not shown in FIG. 1.

If the computer is powered on in this state, initialization of a CPU 11 (including a cache memory) is performed under the control of BIOS at first (steps 401 and 402). Then a hardware configuration and NVRAM are checked (step 403). If a docking station 20 is connected to the computer 10 at this moment, a device ID of a docking station 20 is acquired.

Next, POST is performed (step 404), followed by examining whether work contents are saved by hibernation or not from the check results of NVRAM (step 405). If the contents are not saved, start an OS (for example, a general-purpose OS) through a normal procedure (step 406).

On the other hand, if the work contents are saved by hibernation, a file saved to HDD 18 is copied onto main memory 13 (steps 405 and 407). Then, check results of a hardware configuration at step 403 is examined (step 408). If a device ID of a docking station 20 is detected, it is apparently in an extended configuration. Then, the system jumps to an entry point for starting a general-purpose OS and resuming the state before the suspended state (step 409). In the case of hibernation, HDD 18 has already been running to read out a file saved to HDD 18, which eliminates the another process of powering on the HDD 18.

On the other hand, if a device ID of a docking station 20 is not detected at step 407, it is apparently in a portable configuration (step 408). Then, the system will power off HDD 18 that has started to read out a file in hibernation (step 410), and jump to an entry point for starting a small OS that has been stored in a memory area free for use of main memory 13 (step 411).

In the above-described embodiments, both in the case of using suspend and in the case of using hibernation, an OS to start was selected in accordance with the determination whether a docking station 20 is connected to a computer 10 or not. However, it is still possible to determine whether various peripheral devices other than a docking station 20 are connected to a computer 10 or not to switch OS's to start. In this case, by previously giving an unique device ID to each of the various peripheral devices and by acquiring and identifying the device ID at a hardware check upon startup, it is possible to control the selection and startup of an appropriate OS in accordance with the type of a peripheral device connected to the computer.

One specific example of such an alternative is disaster recovery using a NVRAM USB attachable memory "key". Such a peripheral device may be operatively associated with a computer system by being inserted into a USB port. Then, if the system is otherwise inoperable due to damage to, loss or removal of a hard disk drive, a small OS stored in the memory key may be called in order to restore at least minimal operability to the system and enable, for example, access through a network to a help desk or other resource.

In the drawings and specifications there has been set forth a preferred embodiment of the invention and, although specific terms are used, the description thus given uses terminology in a generic and descriptive sense only and not for purposes of limitation.

What is claimed is:

1. A method, comprising:
    starting, under control of a BIOS, a CPU of a computing system;
    loading a first operating system;
    storing, under control of the first operating system, an image of a second operating system in main memory;
    determining the computing system is transitioning to a suspended state;
    setting a flag in a register, wherein the flag indicates the computing system is transitioning to the suspended state; and
    removing power from the computing system, except for power powering the main memory.

2. The method of claim 1, further including creating, under control of the first operating system, a free memory area in the main memory, wherein the free memory area is not used by the first operating system, and the image of the second operating system is stored in the free memory area.

3. The method of claim 2, wherein creating the free memory area includes creating an Advance Configuration and Power Interface (ACPI) table in the main memory.

4. The method of claim 3, further including:
    determining the computing system is transitioning to a hibernation state;
    setting a second flag in a second register, wherein the second flag indicates the computing system is transitioning to the hibernation state;
    storing the content of the main memory in the first computer data storage element; and
    removing power to the computing system, including the main memory.

5. A computing system, comprising:
    a central processing unit (CPU) in operative communication with a main memory,
    wherein the CPU is configured to, upon starting under control of a BIOS:
    load a first operating system;
    store, under control of the first operating system, an image of a second operating system in the main memory;
    determine the computing system is transitioning to a suspended state;
    set a flag in a register, wherein the flag indicates the computing system is transitioning to the suspended state; and
    remove power from the computing system, except for power powering the main memory.

6. The computing system of claim 5, wherein the CPU is further configured to create, under control of the first operating system, a free memory area in the main memory, wherein the free memory area is not used by the first operating system, and the image of the second operating system is stored in the free memory area.

7. The computing system of claim 6, wherein the CPU is further configured to create the free memory area by creating an Advance Configuration and Power Interface (ACPI) table in the main memory.

8. The computing system of claim 7, wherein the CPU is further configured to:
    determine the computing system is transitioning to a hibernation state;

set a second flag in a second register, wherein the second flag indicates the computing system is transitioning to the hibernation state;

store the content of the main memory in the first computer data storage element; and remove power to the computing system, including the main memory.

9. A program product comprising:

a computer readable medium; and program instructions stored on said medium;

said program instructions, when executing on a computer system, cause the computer to, upon starting under control of a BIOS:

load a first operating system;

store, under control of the first operating system, an image of a second operating system in the main memory;

determine the computing system is transitioning to a suspended state;

set a flag in a register, wherein the flag indicates the computing system is transitioning to the suspended state; and remove power from the computing system, except for power powering the main memory.

10. The program product of claim 9, wherein said program instructions, when executing on the computer system, further cause the computer system to create, under control of the first operating system, a free memory area in the main memory, wherein the free memory area is not used by the first operating system, and the image of the second operating system is stored in the free memory area.

11. The program product of claim 10, wherein said program instructions, when executing on the computer system, further cause the computer system to create the free memory area by creating an Advance Configuration and Power Interface (ACPI) table in the main memory.

12. The program product of claim 11, wherein said program instructions, when executing on the computer system, further cause the computer system to:

determine the computing system is transitioning to a hibernation state;

set a second flag in a second register, wherein the second flag indicates the computing system is transitioning to the hibernation state;

store the content of the main memory in the first computer data storage element; and remove power to the computing system, including the main memory.

\* \* \* \* \*